United States Patent

[11] 3,620,918

[72] Inventors Tatsuo Moroe
Tokyo;
Satohiko Hattori, Kanagawa; Akira Komatsu, Tokyo; Yuzo Yamaguchi, Kanagawa, all of Japan
[21] Appl. No. 878,913
[22] Filed Nov. 21, 1969
[45] Patented Nov. 16, 1971
[73] Assignee Takasago Perfumery Co. Ltd.
Tokyo, Japan
[32] Priority Nov. 22, 1968
[33] Japan
[31] 43/85227

[54] METHOD FOR THE BIOCHEMICAL ISOLATION OF 1-MENTHOL
7 Claims, No Drawings
[52] U.S. Cl. .................................................. 195/2, 195/30
[51] Int. Cl. ...................................................... C12b 1/00
[50] Field of Search ............................................ 195/2, 28, 30, 51, 3; 260/631

[56] References Cited
UNITED STATES PATENTS
3,256,156   6/1966   Frommer et al. ............. 195/30

*Primary Examiner*—A. Louis Monacell
*Assistant Examiner*—Gary M. Nath
*Attorney*—Sughrue, Rothwell, Mion, Zinn & Macpeak ABSTRACT: Method for the biochemical isolation of 1-menthol. Specifically, an improved method for the optical resolution of racemic menthol utilizing an enzyme, carboxylic ester hydrolase, which is produced by micro-organism belonging to the class of Candida, Saccharomyces, Hansenula, Rhodotorula, Torulopsis, Schizosaccharomyces, Pichia, Sporobolomyces, Debaryomyces, Nadsonia, Trichosporon, Brettanomyces, and Cryptococcus.
The 1-menthol may be utilized in perfumes, medicines, etc.

CONSTANTINE D. MISERLIS
INVENTOR.

BY Schiller & Pandiscio
ATTORNEYS.

METHOD FOR THE BIOCHEMICAL ISOLATION OF l-MENTHOL

BACKGROUND OF THE INVENTION

1. Field of the Invention

The present invention relates to a method for the biochemical isolation of l-menthol.

2. Description of the Prior Art

From the stereochemical configuration of menthol, four stereo isomers can exist, that is, menthol, isomenthol, neomenthol and neoisomenthol. Each of these stereo isomers has optical isomers (dextrorotatory(d) and levorotatory(l) forms), so that there are eight optical isomers in all. Among these isomers, l-menthol is one of the main components of natural mint oil, and illustrates the strongest refreshing activity so that it is widely used in perfumes and in medicines.

The l-menthol may be produced by a number of methods. For example, l-menthol crystals can be isolated from natural mint oil by cooling. Synthetically, l-menthol can be obtained from l-methone which is contained in natural mint oil, by reduction with metallic sodium.

On an industrial scale, l-menthol is produced from d-citronellal, which is a compound of citronella oil, by cyclization and hydrogenation. But as these natural raw materials (l-methone and d-citronellal) which have optical activities are available in a very limited supply, it is desirable to synthesize l-menthol from low-priced industrial chemicals, When l-menthol is synthesized from optically inactive raw materials, one important problem is to separate only optically active l-menthol from a mixture of dl-menthol isomers, because the simultaneous formation of all of the dl-isomers (dl-menthol, dl-isomenthol, dl-neomenthol and dl-neoisomenthol) is unavoidable. Many attempts to separate l-menthol have been made in the past, but a successful industrial process has not yet been realized. For this reason, dl-menthol is actually utilized in many instances without complete product purity.

The main industrial process for dl-menthol synthesis consists of the hydrogenation of thymol and the heat equilibration of the resultant mixture of dl-menthol isomers to the following composition: dl-menthol—about 70 percent; dl-isomenthol—about 20 percent; dl-neomenthol—about 10 percent; and dl-neoisomenthol—trace. Further, the ratio of these isomers would vary with reaction conditions making the product composition extremely variable.

Another method of dl-menthol synthesis consists of making a mixture of dl-menthol isomers, the components of which are primarily dl-menthol (about 70 percent), dl-isomenthol and dl-neomenthol, by cyclization and hydrogenation of dl-citronellal, with dl-menthol being separated therefrom.

The hitherto known methods for the optical resolution of the thus-obtained dl-menthol involve the optical isolation of this compound from its phthalic acid semiesters, l-menthoxy acetic acid ester and dl-camphoric acid ester. These methods are too expensive and involve a procedure which is too complicated to be used on an industrial scale, and are therefore only utilized as laboratory processes.

SUMMARY OF THE INVENTION

It is an object of the present invention to provide a method for the biochemical isolation of l-menthol.

It is another object of the present invention to provide a novel method for the optical resolution of dl-menthol or a mixture of dl-menthol isomers containing dl-menthol, which process is acceptable for industrial purposes.

It is still another object of the present invention to provide a practical and useful method for the production of l-menthol.

It is still another object of the present invention to provide industrially optically active l-menthol which is useful for the production of perfumes and medicines from thymol.

It has been discovered that an optically active l-menthol may be biochemically isolated by a process which comprises the optical resolution of an organic carboxylic acid ester of dl-menthol, or by the optical resolution of organic carboxylic acid esters of a mixture of dl-menthol isomers (dl-menthol, dl-isomenthol, dl-neomenthol and dl-neoisomenthol). An enzyme, or number of enzymes, which comprise carboxylic ester hydrolases which have been produced by micro-organisms from the class consisting of Candida, Saccharomyces, Pichia, Sporobolomyces, Debaryomyces, Nadsonia, Trichosporon, Brettanomyces and Cryptococcus may be utilized.

DESCRIPTION OF THE PREFERRED EMBODIMENTS

Figure 1:
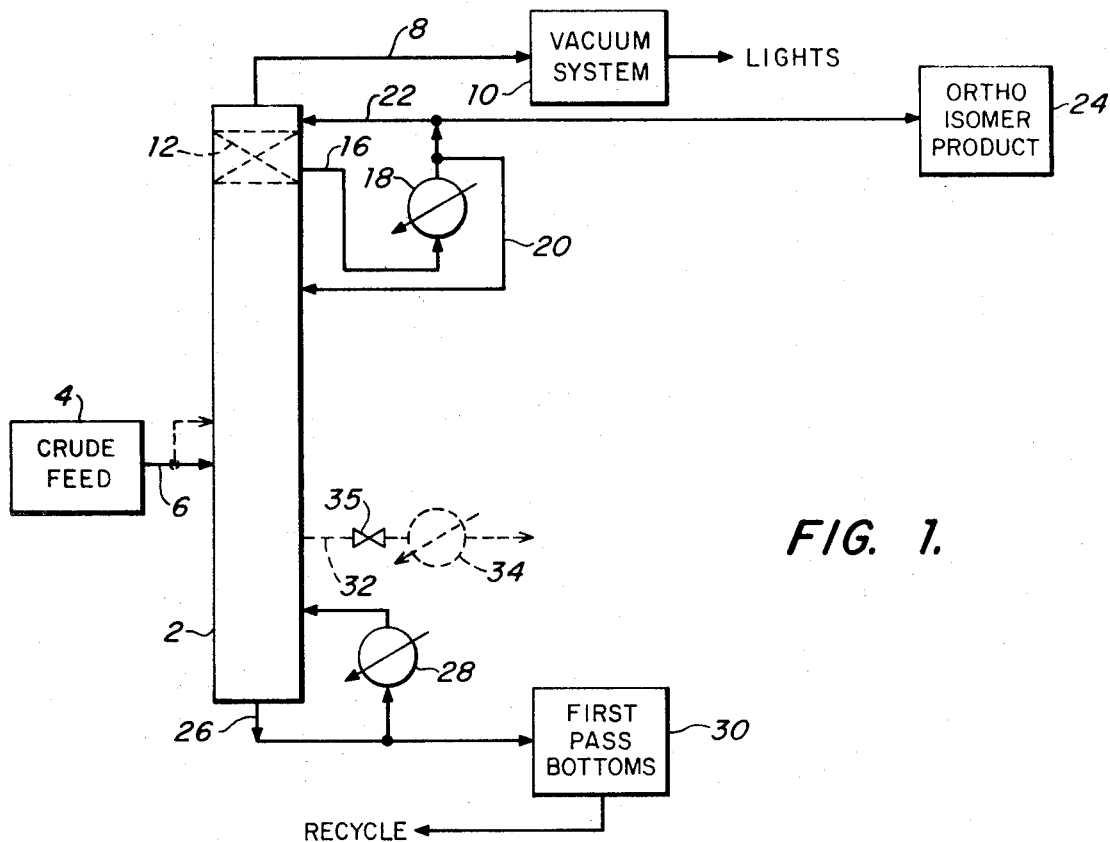
Figure 2:
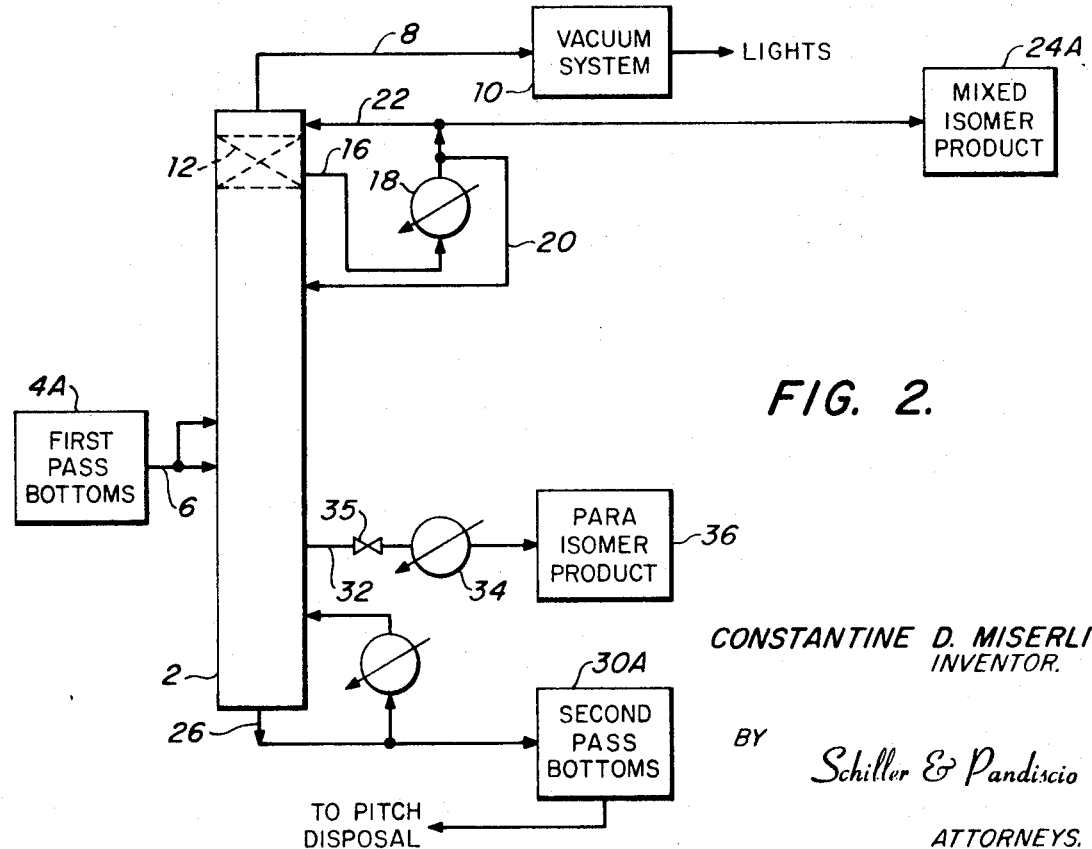
Figure 3:
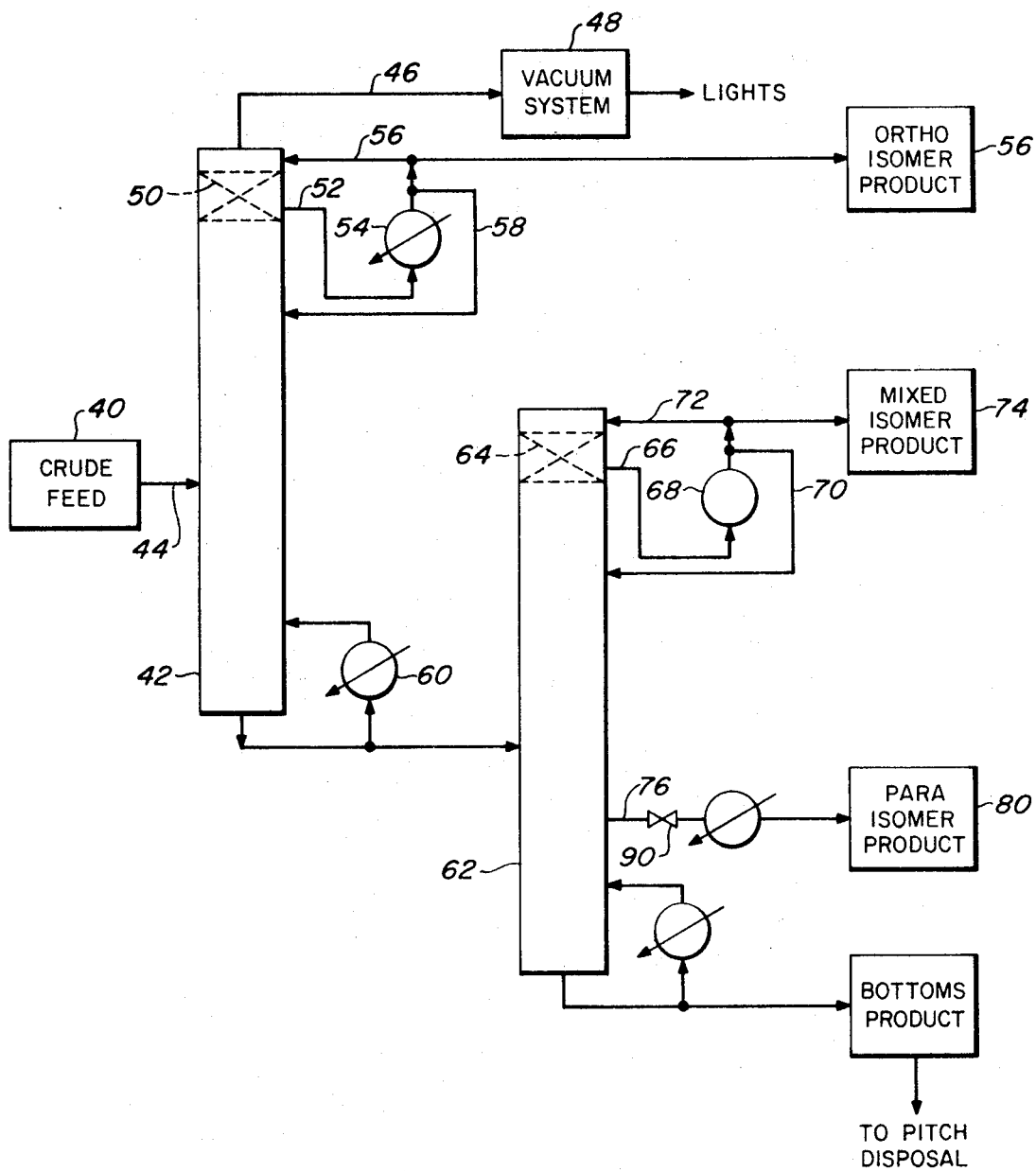

The present inventors have previously elaborated a process for the biochemical isolation of l-menthol from dl-menthol or a mixture of dl-menthol isomers containing dl-menthol. The process comprised treating an organic carboxylic acid ester of dl-menthol, or mixture of this ester with organic carboxylic acid esters of dl-menthol isomers containing dl-menthol therein (wherein the organic carboxylic acid is formic acid or a fatty acid of the general formula: RCOOH, and R is an alkyl group or an alkenyl group of from one to 21 carbon atoms) with an enzyme specifically, carboxylic ester hydrolase, which may be produced by the action of micro-organisms belonging to the group Penicillium, Gliocladium, Trichoderma, Geotrieum, Aspergillus, Pullularia, Fusarium, Absida, Cunninghamella, Rhizopus, Actinomucor, Chlamydomucor, Mucor, Gribberella, Streptomyces and Bacillus; which enzymes have been separated from their cell bodies and their culture medium or which may alternatively be directly used in the form of their cell bodies or culture mediums containing the said enzyme; carboxylic ester hydrolase. The isomer-enzyme composite is subjected to asymmetric hydrolysis, and then an optically active l-menthol and l-isomenthol were both hydrolyzed when a mixture of organic carboxylic acid esters of dl-menthol isomers, containing dl-menthol therein, treated with an enzyme, carboxylic ester hydrolase, and l-menthol and l-isomenthol were liberated. So, in this process it was necessary to separate l-menthol from l-isomenthol. To avoid this step, the employment of a raw mixture which did not contain an ester of dl-isomenthol, or the operation of removal of dl-isomenthol from the raw mixture before the biochemical hydrolysis would be required.

In order to obviate the defect of the above process and to elaborate a process of directly isolating l-menthol from a mixture of dl-menthol and isomers thereof, we have searched for a micro-organism which produces a carboxyl ester hydrolase having the property of hydrolyzing an organic carboxylic acid ester of l-menthol only, and which does not hydrolyse organic carboxylic acid esters of d-menthol dl-isomenthol, dl-neoisomenthol and dl-neomenthol. We have found that a carboxylic ester hydrolase, produced by a certain micro-organism, can selectively hydrolyse only the l-menthol ester among the carboxylic esters of the four racemic menthols, i.e., dl-menthol ester, dl-isomenthol ester, dl-neomenthol ester and dl-neoisomenthol ester; whereby l-menthol is liberated and d-menthyl ester, dl-isomenthyl ester and dl-neoisomenthyl ester remain unhydrolyzed.

The process of the present invention is based upon this observation and it comprises treating an orgainic carboxylic acid ester of dl-menthol, or mixture of this ester with organic carboxylic acid esters of dl-menthol isomers containing dl-menthol therein (wherein the organic carboxylic acid is formic acid or a fatty acid of the general formula: RCOOH, and R is an alkyl group or an alkenyl group of from one to 21 carbon atoms), with an enzyme, specifically carboxylic ester hydrolase, which may be produced by the action of micro-organisms belonging to the group Candida, Saccharomyces, Hansenula, Rhodotorula, Torulopsis, Shizosaccharomyces, Pichia, Sporobolomyces, Debaryomyces, Nadsonia, Trichosporon. Brettanomyces and Cryptococcus; which enzymes have been separated from their cell bodies and their culture medium or which may alternatively be directly used in the form of their cell bodies or culture mediums containing the enzyme carboxylic ester hydrolase. The isomer-enzyme composite is then subjected to asymmetric hydrolysis, and then an optically active 1-menthol is separated.

A test of the selective hydrolysis of the 1-menthyl esters by the above-mentioned micro-organisms which may be preferably employed in the present invention was carried out as follows;

In a test tube having an inner diameter of 18 mm. and a length of 250 mm. 10 ml. of a medium consisting of 10 g. of glucose, 5 g. of dipotassium hydrogen phosphate, 7 g. of peptone and 5 g. of yeast extract in 1 liter of water was charged, and to the medium a test micro-organism was inoculated after sterilization, and the test tube was shaken for 48 hours at 27° C. Then an emulsified menthyl acetate mixture consisting of 80 percent of an aqueous phase containing 2 percent polyvinyl alcohol, and 20 percent of a menthyl acetate mixture which was composed of the following isomers: dl-menthyl acetate 55.2 percent, dl-neomenthyl acetate 34.3 percent, dl-isomenthyl acetate 15.5 percent and dl-neoisomenthyl acetate trace, was added to the medium in an amount described in table 1 and the whole was shaken for 48 hours. The cultured medium was extracted with ethyl ether and ethyl ether was removed from the extract. The resulting residue was analyzed by gas chromatography means. The hydrolysis ratio l-menthol × 100/dl-menthyl acetate+ l-menthol) was calculated from the peak area of the gas chromatograms. The result are given in table 1. The classification of micro-organisms is based on Lodder and Kreger van Rij's "The Yeasts, A Taxonomic Study" (1952).

TABLE 1

| Microorganism | Amount of mixture of acetic acid ester of dl-menthol and isomers thereof added | Ratio of Hydrolysis (%) | Amount of isomenthol liberated (%) |
|---|---|---|---|
| Candida peliculosa | 2 | 17.1 | 0.0 |
| Candida robusta | 2 | 18.3 | 0.0 |
| Candida lipolytica | 2 | 27.4 | 0.0 |
| Candida tenuis | 2 | 2.3 | 0.0 |
| Candida utilis | 2 | 3.0 | 0.0 |
| Saccharomyces cerevisiae var elipsoideus | 2 | 14.0 | 0.0 |
| Saccharomyces rouxii | 2 | 2.5 | 0.0 |
| Saccharomyces rouxii var polymorphus | 2 | 11.3 | 0.0 |
| Pichia fermentans | 2 | 2.5 | 0.0 |
| Pichia membranaefaciens | 2 | 4.7 | 0.0 |
| Schizosaccharomyces pombe | 2 | 9.8 | 0.0 |
| Schizosaccharomyces octosporus | 2 | 2.6 | 0.0 |
| Schizosaccharomyces sp. | 2 | 17.4 | 0.0 |
| Torulopcis dattila | 2 | 16.3 | 0.0 |
| Torulopcis aeria | 4 | 21.4 | 0.0 |
| Torulopcis candida | 2 | 5.8 | 0.0 |
| Torulopcis etchellsii | 2 | 6.0 | 0.0 |
| Hansenula anomala | 2 | 19.4 | 0.0 |
| Hansenula saturnus | 2 | 10.8 | 0.0 |
| Hansenula minuta | 2 | 17.3 | 0.0 |
| Rhodotorula glutinus | 3 | 20.1 | 0.0 |
| Rhodotorula glutinus | 5 | 22.3 | 0.0 |
| Rhodotorula glutinus var rubescens | 3 | 15.0 | 0.0 |
| Rhodotorula rubra | 3 | 10.5 | 0.0 |
| Rhodotorula minuta | 2 | 26.2 | 0.0 |
| Rhodotorula flava | 2 | 19.7 | 0.0 |
| Rhodotorula mucilaginosa | 3 | 24.0 | 0.0 |
| Rhodotorula mucilaginosa | 5 | 27.6 | 0.0 |
| Rhodotorula mucilaginosa | 10 | 14.7 | 0.0 |
| Sporobolomyces roseus | 2 | 2.6 | 0.0 |
| Sporobolomyces pararoseus | 1 | 6.0 | 0.0 |
| Debaryomyces hansenii | 1 | 2.7 | 0.0 |
| Debaryomyces kloeckeri | 2 | 2.4 | 0.0 |
| Nadsonia fulvecens | 2 | 5.8 | 0.0 |
| Trichosporon pullurans | 2 | 17.1 | 0.0 |
| Trichosporon behrendii | 2 | 14.0 | 0.0 |
| Brettanomyces klausenii | 1 | 9.3 | 0.0 |
| Brettanomyces bruxellensis | 1 | 3.4 | 0.0 |
| Cryptococcus alhidus | 2 | 4.7 | 0.0 |
| Cryptococcus laurentii var flavescens | 2 | 8.6 | 0.0 |

As the organic carboxylic acid used to produce the organic carboxylic acid ester of dl-menthol, formic acid and organic carboxylic acids of the general formula "RCOOH" were used (wherein R is an alkyl or an alkenyl group having from one to 21 carbon atoms). Examples of the acid are, for example, acetic acid, propionic acid, butyric acid, Caproic acid, caprylic acid, capric acid, lauric acid, myristic acid, palmitic acid, stearic acid, acrylic acid, oleic acid, erucic acid and the like. Formic acid, acetic acid, propionic acid and myristic acid are best suited for use in the present invention of these carboxylic acids, especially acetic acid since it is lowest in cost and gives a high asymmetric hydrolysis ratio.

The most important, and characteristic, aspect of the present invention is the enzymatic treatment of an organic carboxylic acid ester of dl-menthol, or a mixture of the organic carboxylic acid esters of dl-menthol isomers containing the organic carboxylic acid of dl-menthol with carboxylic ester hydrolase produced by micro-organisms as described above, and utilizing the hydrolase to selectively hydrolyze only the esters of l-menthol.

In the present invention, hydrolysis of the ester of l-menthol was carried out not only by shaking in contact with the growing micro-organisms or the intact cells thereof, but also by mixing with a culture medium free from living cells and with the cell-free extracts of the above described micro-organisms.

In carrying out this process, the preferred reaction temperature is 25–45° C. most preferably 25–37° C., in order to minimize inactivation of the enzymes by heat denaturation. The reaction time is about 5–48 hours at 25–37° C. The amount of enzyme utilized in crude form (for example example 8), is about 0.1–0.5 percent by weight, based on the weight of the reaction mixture. The amount of the organic carboxylic esters of the mixture of dl-menthol isomers, is preferably in the range of about 2–10 percent by weight of the weight of the reaction mixture. At higher concentrations, the rate of hydrolysis may be decreased. However, even at higher concentrations, the reaction rate may be increased by using a larger amount of the enzymes. An organic carboxylic acid ester of dl-menthol or a mixture of the organic carboxylic acid esters of dl-menthol isomers containing dl-menthol may be added as it is, or in the emulsified form. The hydrolysis reaction may be performed rather quickly when the addition is carried out in the emulsified form.

According to the present invention, an organic carboxylic acid ester of dl-menthol or a mixture of the organic carboxylic acid esters of dl-menthol isomers containing dl-menthol may be treated with the carboxylic ester hydrolase above mentioned, and by this treatment, only an organic carboxylic acid aster of l-menthol may be hydrolyzed to 1-menthol while the other esters remain. Therefore, if an organic carboxylic acid ester of dl-menthol is employed as a starting material, only the 1-form is hydrolyzed and the d-form is not affected and remains unchanged. Separation of the 1-menthol from the reaction mixture can be performed easily, based on the difference of the physical and chemical properties, for example, by absorption (absorption chromatography using alumina), by extraction with a solvent, by fractional distillation and the like.

The following examples will serve to set forth the preferred embodiments of the present invention.

EXAMPLE 1

In a flask, 100 ml. of a medium containing 2.0 percent of glucose, 0.5 percent of dipotassium hydrogen phosphate, 0.7 percent of peptone and 0.5 percent of yeast extract was charged, sterilized and to the medium 2 platinum loopfuls of *Saccharomyces cerevisiae var elipsoideus*, previously cultured in a slant culture, was inoculated. The whole was shaken (amplitude of vibration =6 cm. rotation =150 r.p.m.) for 48 hours at 27° C., then an emulsion of 2 g. of a mixture of acetic acid ester of dl-menthol and isomers thereof (dl-menthyl acetate 55.2 percent dl-isomenthyl acetate 15.3 percent, dl-neomenthyl acetate 29.3 percent and dl-neoisomenthyl acetate, trace) in 8 ml. of a 2 percent aqueous polyvinyl alcohol solution was added and the whole was shaken for another 48 hours. Then, the reaction mixture was extracted with hexane and chromatographed with a column of alumina to separate 1-menthol from unreacted esters. 0.24 g. of a 1-menthol was obtained. Yield: 12 percent. $[\alpha]_{20}^{D}=-46.8°$ (c=5, ethanol).

EXAMPLE 2

In a flask, 100 ml. of the medium described in example 1 was charged, sterilized and to the medium *Candida peliculosa* was inoculated. The whole was shaken for 48 hours and 3 g. of a mixture of formic acid ester of dl-menthol and isomers thereof (dl-menthyl formate 55.2 percent dl-isomenthyl formate 15.3 percent, dl-neomenthyl formate 29.3 percent and dl-neoisomenthyl formate, trace) was added to the medium and the whole was shaken for another 28 hours. The, the reaction mixture was extracted with hexane and chromatographed with a column of alumina to separate 1-menthol from the unreacted esters. 0.53 g. of 1-menthol was obtained. Yield: 17.7 percent. $[\alpha]_D^{20}=-49.5°$ (c=5, ethanol).

EXAMPLE 3

To 100 ml. of the medium described in example 1, *Schizosaccharomyces pombe* was inoculated and cultured for 48 hours at 27° C., and to the medium 2 g. of a mixture of myristic acid ester of dl-menthol and isomers thereof (dl-menthyl myristate 61 percent, dl-isomenthyl myristate 22 percent, and dl-neomenthyl myristate 17 percent) was added and the whole was shaken for 48 hours. The reaction liquid was steam distilled and 1-menthol was recovered as the distillate. 0.35 g. of 1-menthol was obtained. Yield: 17.5 percent $[\alpha]_D^{20}=-42°$ (c=5, ethanol).

EXAMPLE 4

In a fermenting tank having a capacity of 30 liters, 20 liters of the medium described in example 1 was charged, sterilized and to the medium seed mash of previously cultured *Hansenula anomala* was added in an amount of 10 percent. Then, the whole was cultured for 24 hours at 27° C. with agitation (200 r.p.m.) and aeration (7.5 liters/minute), and 500 g. of a mixture of caproic acid ester of dl-menthol and isomers thereof (dl-menthyl caproate 61 percent, dl-isomenthyl caproate 22 percent and dl-neomenthyl caproate) was added and the whole was cultured for 72 hours with agitation and aeration. Subsequently, the agitation and aeration were stopped and the oil that floated up on the reaction mixture was taken up, dissolved in 1.5 liters of n-hexane and mixed with 1.5 liters of a 65 percent aqueous methanol solution with agitation, then the mixture was allowed to stand quietly and the aqueous layer was separated. To the aqueous methanol, 200 ml. of hexane was added and mixed, and the whole was allowed to stand quietly, and the aqueous methanol layer was separated. From the aqueous methanol layer, methanol was removed by distillation and the resulting raw crystal of 1-menthol was recrystallized from nitromethane to give 50 g. of 1-menthol. Yield: 10 percent. $[\alpha]_D^{20}=-45°$.

EXAMPLE 5

In a fermenting tank having a capacity of 30 liters, 20 liters of wort and 1 kg. of glucose were charged, sterilized and seed mash of *Rhodotorula mucilaginosa*, previously cultured for 24 hours, was inoculated in an amount of 5 percent and the whole was cultured for 30 hours. Then 1.2 kg. of the mixture of acetic acid ester of dl-menthol and isomers thereof described in example 1 was added and the culture was continued for another 48 hours. The reaction product which floated up on the reaction mixture was taken up and treated in the same manner described in example 4 to give 270 g. of 1-methanol. Yield: 22.5 percent. $[\alpha]_D^{20}=-49.5°$.

EXAMPLE 6

In a large flask, 1 liter of the medium of example 5 was charged, sterilized and seed mash of *Rhoduotarula minuta* was inoculated in an amount of 5 percent and the whole was cultured for 48 hours at 27° C. Then, 100 g. of a mixture of acetic acid ester of dl-menthol and isomers thereof (dl-menthyl acetate 25 percent, dl-isomenthyl acetate 23 percent, dl-neomenthyl acetate 14 percent and dl-neoisomenthyl acetate 38 g.) was added to the medium and the whole was shaken for 67 hours. The reaction product was taken up and chromatographed with a column of alumina to isolate 1-menthol. 9.7 g. of 1-menthol was obtained. Yield: 9.7 percent. $[\alpha]_D^{20}=-50.0°$ (c=5, ethanol).

EXAMPLE 7

In the manner described in example 5, Rhodotorula mucilaginosa was cultured for 30 hours and 100 ml. of the cultured mixture was centrifuged. The resulting cells were dispersed in 20 ml. of a 0.1 M phosphate buffer solution (pH 7.0) was crushed by ultrasonic waves with chilling and centrifuged under high speed. To 10 ml. of the resulting supernatant, 10 ml. of an emulsion of the mixture of acetic acid ester of dl-menthol and isomers thereof described in example 1 was added and the whole was shaken for 8 hours at 30° C. and extracted with ether. Gas chromatographical analysis: 1-menthol 14 percent and l-siomenthol 0 percent.

EXAMPLE 8

In the manner described in example 5, Rhodotorula mucilaginosa was cultured for 30 hours and 1 liter of the cultured mixture was centrifuged. The resulting cells were dispersed in 500 ml. of a 0.1 M phosphate buffer solution (pH 7.0), crushed by ultrasonic waves with chilling and centrifuged under high speed. To the resulting supernatant, ammonium sulfate was added and the esterase precipitation formed at 40 to 80 percent saturation was gathered and dried under reduced pressure (yield 4.7 g.).

In 100 ml. of a 0.2 M phosphate buffer solution, 0.5 g. of the resulting esterase preparation was dissolved and kept at 30° C. and to the solution, 50 ml. of an emulsion of the mixture of acetic acid ester of dl-menthol and isomers thereof described in example 1 was added and the whole was agitated slowly for 10 hours. Then, the reaction mixture was extracted with ether and chromatographed with a column of alumina to give 1.0 g. of l-menthol. Yield: 10 percent. $[\alpha]_D^{20}=-49.7°$ (c=5, ethanol).

EXAMPLE 9

In a jar fermentor having a capacity of 5 liters, 3 liters of a medium containing 5.0 percent of soybean meal, 2.0 percent of glucose, 1 percent of ammonium sulfate, 1 percent of potassium dihydrogen phosphate and 1 percent of magnesium sulfate was charged, sterilized and 60 ml. of *Trichosporon pullurans*, previously cultured was inoculated and the whole was cultured for 24 hours. Then, 150 g. of the mixture of acetic acid ester of dl-menthol and isomers thereof described in example 1 was added and the whole was agitated for 72 hours with aeration, and the reaction product was extracted with hexane and treated as described in example 1 to give 13.2 g. of l-menthol. Yield: 8.8 percent. $[\alpha]_D^{20}=-49.2°$ (c=5, ethanol).

EXAMPLE 10

In a flask having a capacity of 500 ml., 100 ml. of the medium described in example 9 was charged, sterilized and 2 ml. of seed mash of *Torulopcis dattila*, previously cultured for 30 hours, was inoculated and the whole was shaken for 48 hours at 27° C. Then 10 g. of dl-menthyl acetate was added to the medium and the whole was shaken for another 96 hours. The reaction mixture was extracted with ether after addition of 10 g. of sodium sulfate and the extract was evaporated and the resulting residue was analyzed by gas chromatography. The ratio of hydrolysis was 18.0 percent. The residue was chromatographed with a column of alumina to give 1.6 g. of l-menthol. Yield: 16.0 percent. $[\alpha]_D^{20}=-49.1°$ (c=5, ethanol).

What is claimed is:

1. A method for the biochemical isolation of l-menthol which comprises: selectively hydrolyzing only an organic carboxylic acid ester of l-menthol among the group consisting of an organic carboxylic acid ester of dl-menthol and a mixture of organic carboxylic acid esters of dl-menthol isomers containing dl-menthol, wherein the organic carboxylic acid utilized to form said ester is e selected from the group consisting of formic acid and fatty acids of the general formula RCOOH, wherein R is a member selected from the group consisting of an alkyl group and an alkenyl group having from one to 21 carbon atoms, said hydrolysis being performed by an enzyme, carboxylic ester hydrolase, which has been produced by the action of micro-organisms belonging to the class consisting of Candida Saccharomyces, Hansenula, Rhodotorula, Torulopcis, Schizosaccharomyces, Pichia, Sporobolomyces, Debaryomyces, Nadsonia, Trichosporon, Brettanomyces and Cryptococcus; and separating optically active l-menthol from the enzyme reaction mixture.

2. A process as in claim 1, wherein said organic carboxylic acid is acetic acid.

3. A process as in claim 1, wherein said hydrolyzation is conducted at a temperature of from about 25° to about 45° C.

4. A process as in claim 1, wherein the amount of enzyme utilized is from about 0.1 to 0.5 percent, by weight, based on the enzyme reaction mixture.

5. A process as in claim 1, wherein the amount of organic carboxylic ester is in the range of from about 2 to about 10 percent by weight, based on the reaction mixture.

6. A process as in claim 1, wherein said enzyme is utilized in the form of actively growing micro-organism cells from the defined class.

7. A process as in claim 1, wherein said enzyme is utilized in the form of a cell-free extract produced from said micro-organisms.

* * * * *

UNITED STATES PATENT OFFICE
CERTIFICATE OF CORRECTION

Patent No. 3620918　　　　　　　　　　　Dated　November 16, 1971

Inventor(s)　TATSUO MOROE ET AL

It is certified that error appears in the above-identified patent and that said Letters Patent are hereby corrected as shown below:

IN THE DRAWINGS:

Please cancel the drawings, since they do not belong to this patent.

Signed and sealed this 30th day of May 1972.

(SEAL)
Attest:

EDWARD M. FLETCHER, JR.　　　　　　　ROBERT GOTTSCHALK
Attesting Officer　　　　　　　　　　Commissioner of Patents